(12) United States Patent
Mononen et al.

(10) Patent No.: US 7,788,493 B2
(45) Date of Patent: Aug. 31, 2010

(54) AUTHENTICATING USERS

(75) Inventors: Risto Mononen, Espoo (FI); Nadarajah Asokan, Espoo (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 1359 days.

(21) Appl. No.: 11/060,374

(22) Filed: Feb. 17, 2005

(65) Prior Publication Data

US 2005/0287990 A1 Dec. 29, 2005

(30) Foreign Application Priority Data

Jun. 28, 2004 (GB) ................. 0414421.8

(51) Int. Cl.
*H04L 9/32* (2006.01)
(52) U.S. Cl. .................. 713/170; 713/155; 455/411
(58) Field of Classification Search ............ 713/155, 713/156, 170, 175; 707/200; 455/411
See application file for complete search history.

(56) References Cited

U.S. PATENT DOCUMENTS

| 2003/0110374 A1 | 6/2003 | Yamamoto et al. ........... 713/155 |
| 2003/0115456 A1* | 6/2003 | Kapoor ........................ 713/156 |
| 2003/0172090 A1* | 9/2003 | Asunmaa et al. ............. 707/200 |

FOREIGN PATENT DOCUMENTS

CN 1461544 (A) 12/2003

OTHER PUBLICATIONS

3GPP TS 33.221: "3rd Generation Partnership Project; Technical Specification Group Services and System Aspects; Generic Authentication Architecture (GAA); Support for Subscriber Certificates". Release 6. V1.1.0 (Feb. 2004).*
3GPP TS 33.220: "3rd Generation Partnership Project; Technical Specification Group Services and System Aspects; Generic Authentication Architecture (GAA); Generic Bootstrapping Architecture". Release 6. V1.1.0 (Feb. 2004).*
PKCS#10 v1.7: "Certification Request Syntax Standard", RSA Laboratories, May 2000.*
Myers M., et al.: "Internet X.509 Certificate Request Message Format", RFC 2511, Mar. 1999.*
M. Myers et al.: "Internet X.509 Certificate Request message Format", RFC 2511, Mar. 1999. http//www.ietf.org/rfc/rfc2511.txt.*
3GPP TS 33.220: "3rd Generation Partnership Project; Technical Specification Group Services and System Aspects; Generic Authentication Architecture (GAA); Generic Bootstrapping Architecture". Release 6.V1.1.0 (Feb. 2004).*

(Continued)

*Primary Examiner*—Brandon S Hoffman
*Assistant Examiner*—Hee Song
(74) *Attorney, Agent, or Firm*—Harrington & Smith

(57) ABSTRACT

A method of authenticating a user seeking access to a service from a service provider in a communication network, the method comprising: allocating to a user a plurality of service-specific identities for accessing respective services; issuing a request from the user, the request identifying the service to be accessed and including a public key of the user; at a certification authority, authenticating the request and issuing a public key certificate for binding the service-specific identity with the public key in the request, and returning the public key certificate to the user.

20 Claims, 5 Drawing Sheets

OTHER PUBLICATIONS

3GPP TS 33.221: "3rd Generation Partnership Project; Technical Specification Group Services and System Aspects; Generic Authentication Architecture (GAA); Support for Subscriber Certificates." Release 6. V1.1.0 (Feb. 2004).*

Millman, D.: "Cross-Organizational Access Managemen—A Digital Library Authentication and Authorization Architecture", D-Lib Magazine, vol. 5, No. 11. Nov. 1999. http://webdoc.sub.gwdg.de/edoc/aw/d-lib/dlib/november99/millman/11millman.html.*

M. Myers et al.: "Internet X.509 Certificate Request Message Format," RFC 2511, Mar. 1999. http//www.ietf.org/rfc2511.txt.*

3GPP TS 33.220: "3rd Generation Partnership Project: Technical Specification Group Services and System Aspects; Generic Authentication Architecture (GAA); Generic Bootstrapping Architecture." Release 6.v1.1.0 (Feb. 2004).*

Millman, D.: "Cross-Organizational Access Management—A Digital Library Authentication and Authorization Architecture," D-Liblib/dlib/november99/millman/llmillman.html.*

Bajaj, S., et al, Web Services Federation Language (WS-Federation), Version 1.0, BEA, IBM, Microsoft, RSA Security, Verisign, Jul. 8, 2003, pp. 1-41, Retrieved from the Internet.

3GPP TS 33.221 V6.0.0, $3^{rd}$ Generation Partnership Project; Technical Specification Group Services and System Aspects; Generic Authentication Architecture (GAA); Support for subscriber certificates (Release 6), Mar. 2004.

3GPP TS 23.003 V6.3.0 (Jun. 2004); $3^{rd}$ Generation Partnership Project; Technical Specification Group Core Network; Numbering Addressing and Identification (Release 6).

ARIB STD-T63-33.220 V6.3.0 (Dec. 2004); Generic Authentication Architecture (GAA); Generic bootstrapping architecture (release 6).

3GPP TS 33.221 V6.2.0 (Dec. 2004); $3^{rd}$ Generation Partnership Project; Technical Specification Group Services and System Aspects; Generic Authentication Architecture (GAA); Support for subscriber certificates (release 6).

* cited by examiner

| Username | SI1 | SSI1 | $K_s1$ |
|---|---|---|---|
|  |  |  |  |
|  | $SI_i$ | $SSI_i$ | $K_{si}$ |
|  |  |  |  |
|  | $SI_n$ | $SSI_n$ | $K_{sn}$ |
|  |  |  |  |
|  |  |  |  |
|  |  |  |  |

FD

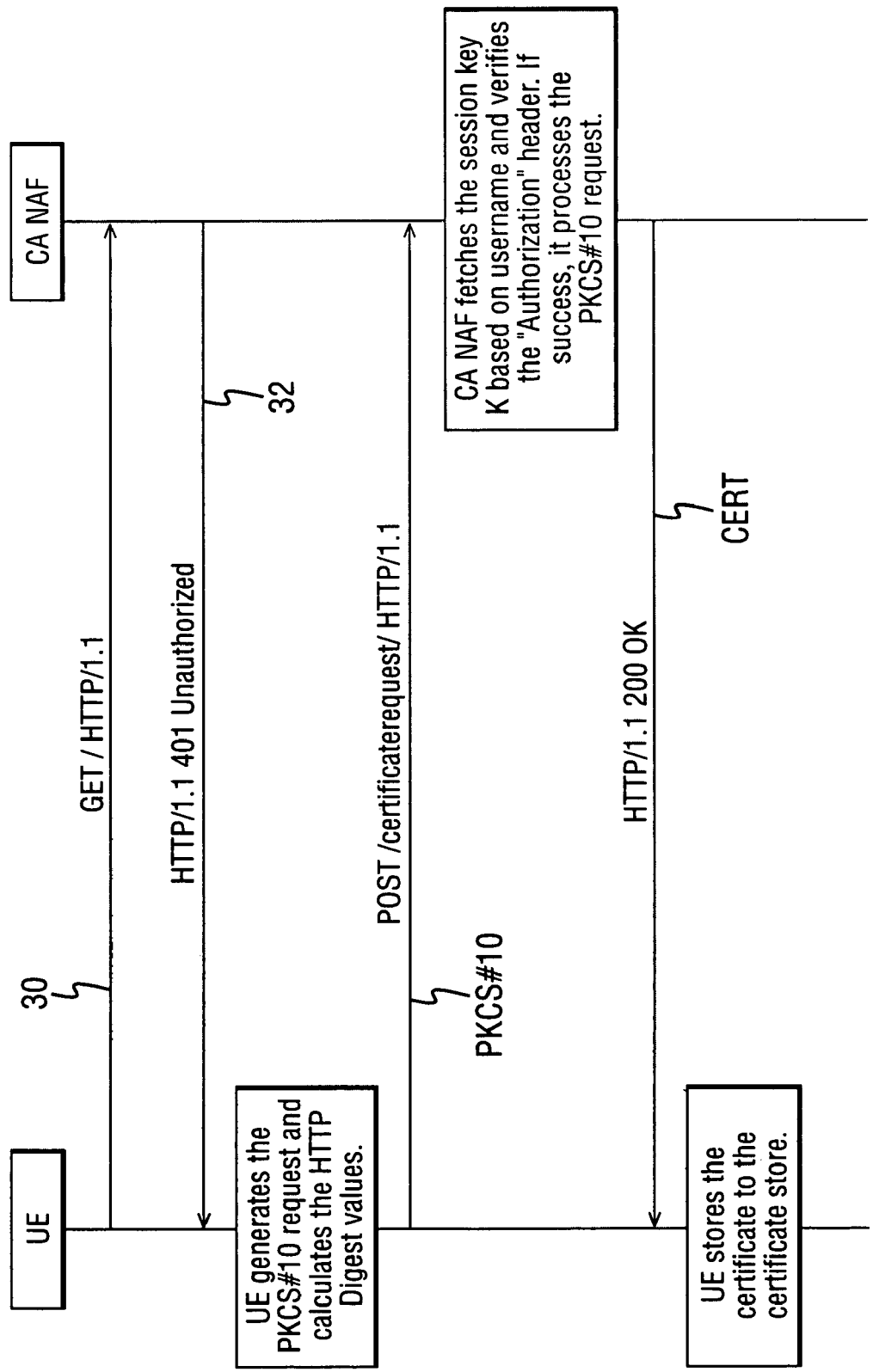

AUTHENTICATING USERS

FIELD OF THE INVENTION

The present invention relates to authenticating users, particularly in the context of providing services to the users (subscribers) of a wireless communications network.

BACKGROUND OF THE INVENTION

One way in which user privacy can be maintained is for a user to supply different identities to different service providers. These identities are referred to herein as service-specific identities. In such a case however it is necessary for the operator of a network for subscribers to provide an identity management service which can associate service-specific identities with authorised subscribers. It is also useful if an identity management provider can make authorisations not only on behalf of itself, but also on behalf of other service providers. This means that users can invoke personalised services without having to sign on separately on each service profile site.

This arrangement is known as identity federation and allows service providers to read a user's identity from a centralised place. A user does not have to provide all the service providers with specific identity information.

There are currently two significant authentication procedures specified for wireless communication networks where a user equipment (UE) in the form of a mobile terminal wishes to access a service from a service provider in the network. The so-called Liberty Alliance (LA) standard uses an authentication procedure where a liberty enabled client (LEC) is a client that has, or knows how to obtain, knowledge about the identity provider that the user wishes to use with the service provider. It specifies service-specific identity mapping at an identity provider (IDP). Each subscriber has multiple identities for accessing service providers (SP). A federation directory at the identity provider stores relations between users, their identities and the services. The identity provider asserts a service-specific identity towards the service provider who recognises the user by that service-specific identity. The ability to present different identities to different service providers allows subscriber privacy to be maintained. According to the Liberty Alliance standard, the user may avoid revealing his real identity when invoking services. Instead of revealing his real identity, the user can either invoke the services anonymously or use a pseudonym (a service-specific identity). The federation directory maps the user's real identity to his pseudonyms or service-specific identities so that the service provider will not know the real identity. With the pseudonym and the mapping service the service provider can access, for example, the user's location or presence state. This allows a service provider to use the pseudonym to access the location of the user from an identity service provider via the mapping in the federation database. The Liberty Alliance standard specifies signed HTTP/soap binding to be used for assertions. However, there are many existing services which are not aware of Liberty assertions but rely on other forms of "assertions" for access such as traditional public key certificates. An example of such a service is access control to corporate virtual private networks (VPNs).

Another existing form of authentication is 3GPP support for subscriber certificates (SSC) [3GPP TS 33.221]. This is implemented as a 3GPP generic authentication architecture (GAA) [3GPP TS 33.220] and specifies a way to request a subscriber certificate for a specific identity from the certificate authority (CA). In this case, the specific identity is the identity of the user, and is not service-specific. According to the GAA/SSC technique, generic bootstrapping architecture (GBA) implanted at the user equipment authenticates the user equipment in conjunction with an authentication server at the service provider, and they agree on a shared key material. The generic bootstrapping architecture delivers the shared key material to a certificate authority CA. The user equipments generates an asymmetric public/private key pair and requests certification from the certificate authority. If authorised, a certificate is returned which associates the public key with the identity of the requesting user. The certification procedure is protected by the shared key material.

Mobile operators can authenticate their mobile subscribers using USIM, ISIM, user name/password pair or X.509 public key certificates. In the case of certificates, the authenticated identity is in the subjectName field or in the SubjectAltName extension of the certificate [RFC 3280].

The 3GPP/GAA/SSC authentication procedure does not have a mechanism to indicate the service provider that the subscriber wants to access. Only the identity of the user can be indicated and authenticated by the certificate. There is no support for certificate based authentication of multiple identities or service-specific identities. Although the SubjectAltName extension can be used to carry multiple identities and service-specific identities, the problem is that the user equipment needs to be able to indicate during the certification procedure the intended identity or identities, i.e. service or services it plans to use the certificate with. It does not want to put all the possible identities into one certificate, because discovering the bindings between different identities would be become very easy since the certificate is public.

SUMMARY OF THE INVENTION

It is an aim of the present invention to provide an authentication system which is not subject to the limits of the two systems discussed above.

According to one aspect of the invention there is provided a method of authenticating a user seeking access to a service from a service provider in a communication network, the method comprising: allocating to a user a plurality of service-specific identities for accessing respective services; issuing a request from the user, the request identifying the service to be accessed and including a public key of the user; at a certification authority, authenticating the request and issuing a public key certificate for binding the service-specific identity with the public key in the request, and returning the public key certificate to the user.

In the following described embodiment, the request includes a service identifier identifying the service to be accessed and a requester identifier identifying the user. The method comprises the further step of, at the certification authority, mapping the service identifier, requester identifier pair to the service specific identity to be authenticated. However, it is also possible to implement the invention where the request identifies the service specific identity and wherein the method comprises the further step of the certification authority verifying that the user is authorised to use the service specific identity.

In the preferred embodiment, the public key is generated at a user terminal as part of an asymmetric key pair including the public key and a private key. However, key pairs could be obtained in other ways, for example generated by the certification authority or from a security element attached to the user terminal.

The invention is particularly useful in the context of wireless communications networks, though it will be appreciated that the invention is also applicable to other types of communication networks.

Another aspect of the invention provided a user terminal for user in a communications network comprising: means for issuing a request identifying a service to be accessed via the wireless communications network and including a public key; means for receiving a public key certificate issued by a certification authority which associates a service-specific identity for the service to be accessed with the public key; and means for forwarding the public key certificate to a service provider for authenticating the service-specific identity for the user and thereby authorising the access to the service.

A further aspect of the invention provides an authentication system for use in a communications network for allowing access to a service from a service provider, the system comprising: means for receiving a request from a user, the request identifying the service to be accessed and including a public key of the user; and a certification authority arranged to authenticate the request and issue a public key certificate for a service-specific identity of the service to be accessed and to return the public key certificate to the user.

For a better understanding of the present invention and to show how the same may be carried into effect reference will now be made by way of example to the accompanying drawings.

BRIEF DESCRIPTION OF THE DRAWINGS

FIG. 5 illustrates the message flow between the subscriber and the certificate authority.

DESCRIPTION OF THE PREFERRED EMBODIMENTS

Figure 1:
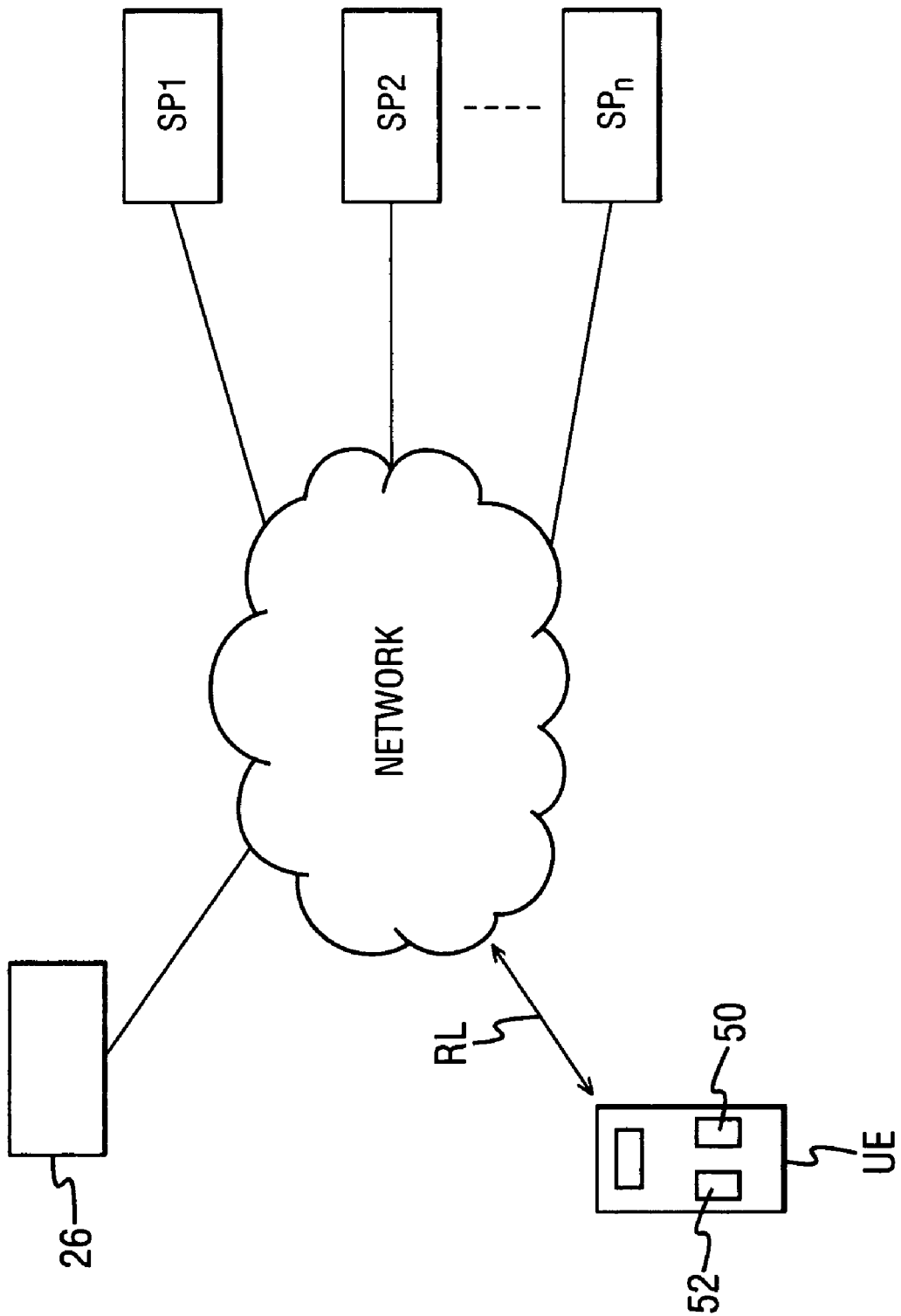
FIG. 1 is a schematic diagram showing a communications network where a subscriber can access one or more services.

FIG. 1 is a schematic block diagram of a wireless communications network for providing services to a subscriber. The subscriber is indicated in the form of a user equipment (UE), which can be a mobile terminal such as a mobile telephone, personal computer or any other kind of mobile communicating device. The user equipment UE has a receive/transmit circuit 50 which is capable of receiving and transmitting data, such as request and response messages, to the network over a radio link RL capable of supporting wireless communications. The user equipment UE also includes a memory 52 for holding authentication information as discussed in more detail in the following. The mobile terminal is capable of executing client software as described in more detail in the following. The subscriber UE communicates with a number of different service providers SP1, SP2 . . . SPN via an operator network. The network includes or has access to an authorisation subsystem 26 which acts as a centralised identity provider for the service providers which are accessing the network. A subscriber wishing to access a service will be authorised based on his authenticated identity.

Figure 2:
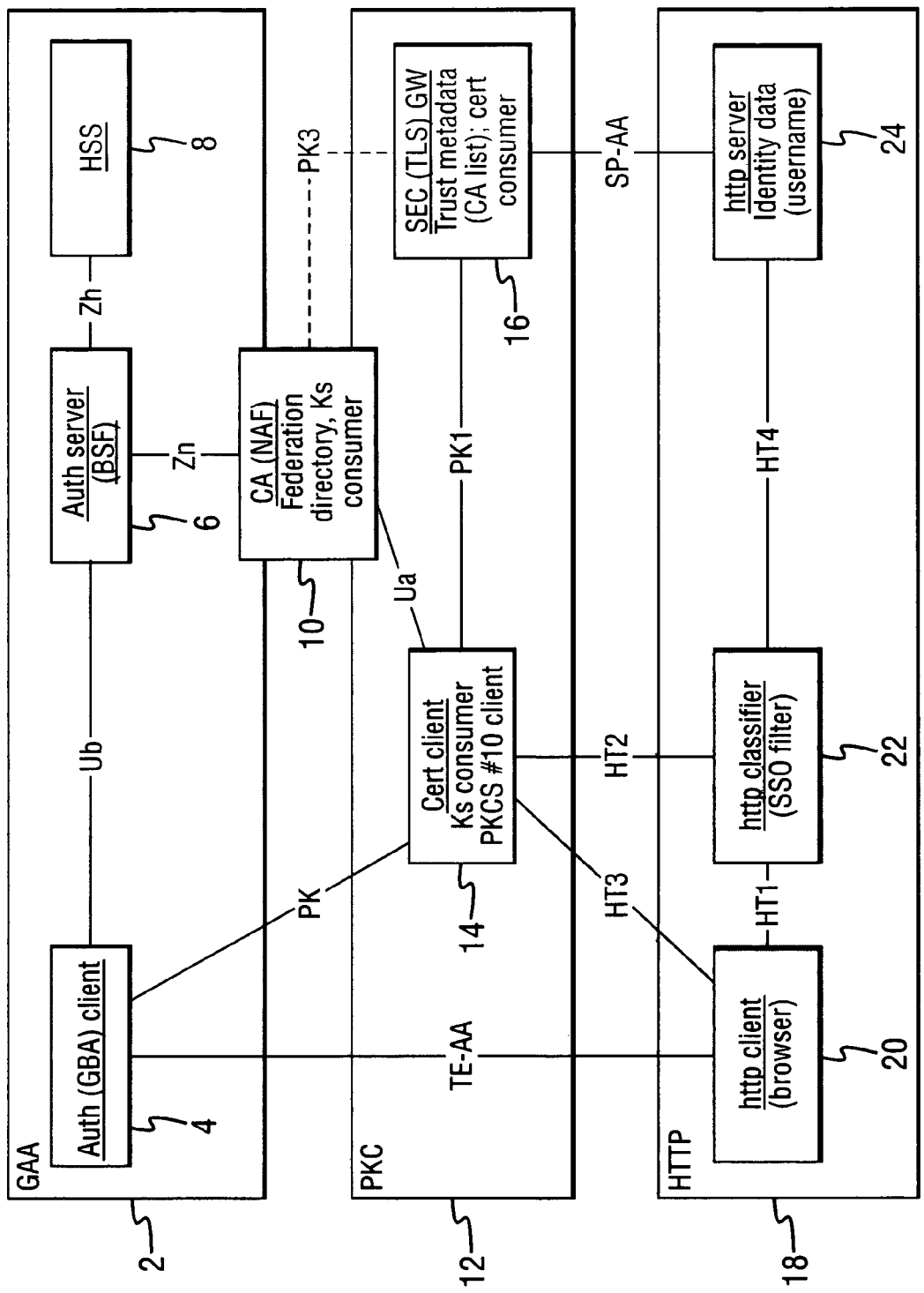
FIG. 2 illustrates an exemplifying architecture for implementing an embodiment of the invention.
Figure 3:
FIG. 3 is a schematic diagram of a federation directory.

FIG. 2 illustrates an exemplifying architecture for implementing an embodiment of the present invention. It illustrates a generic authentication architecture (GAA) which includes a generic bootstrapping architecture (GBA) client 4 executed at the mobile terminal connected to an authentication server (Bootstrapping Server Function—BSF) via a Ub interface. The authentication server 6 is connected to a home subscriber server (HSS)/home location register (HLR) 8, which stores authentication data including keys K and International Mobile Subscriber Identity (IMSI) for the subscribers. The authentication server 6 is connected to a certificate authority (CA) 10 over a Zn interface. The certificate authority 10 includes a federation directory. The federation directory (FD) is illustrated in FIG. 3. It associates each subscriber identity with a plurality of service-specific identities (SSIs) which the subscriber uses as its face for accessing different services from service providers. The subscriber identity in the federation directory is the user name by which the operator network knows the subscriber. Reference numeral 12 denotes a public key certificate domain PKC. The public key certificate domain 12 comprises a certification client 14 (executed at the mobile terminal which is connected to the authorisation client 4 via a PK interface, and to the certificate authority 10 via a Ua interface. The public key certificate domain 12 also includes a Security (Transport Layer Security) SEC(TLS) gateway function 16 which is connected to the certification client 14 via a PK1 interface. The SEC(TLS) gateway 16 is part of the HTTP server that does the TLS authentication part on behalf of the HTTP server.

Note that in the following description the example which is given is implemented with http based services. However, the underlying principle can be used for IPSec (Internet Protocol Security), VPN (Virtual Private Networks) or WLAN (Wireless Local Area Networks) as well.

Reference numeral 18 denotes an http domain which comprises an http client 20 for example in the form of a browser, which is connected to the certification client 14 of the PKC domain via an HT3 interface and to the authorisation client of the GM domain via a TE-M interface. The http client 20 is connected to an http classifier 22 via an HT1 interface. The http classifier is connected to an http server function 24 via an HT4 interface. The http classifier 22 is connected to the certification client of the PKC domain via an HT2 interface. The http server function 24 is connected to the SEC(TLS) gateway function 16 of the PKC domain via an internal SP-AA interface. The http client and classifier are executed at the mobile terminal UE. The http server function 24 is associated with one of the service providers SP of FIG. 1.

Returning to the GM domain 2, the GBA authentication client 4 in the user equipment UE authenticates to the BSF server, and they agree on a shared key material. The server BSF 6 is used to authenticate the user equipment using the HTTP Digest Authentication and Key Agreement (AKA) protocol specified in Request for Comments (RFC) 3310, resulting in a shared key material between the BSF server 6 and the user equipment UE. The BSF server 6 interfaces with the home subscriber server/home location register 8 to fetch the corresponding authentication information, in the form of authentication triplet/vectors. The certification authority 10 acts as a PKI portal and can issue a certificate for the user equipment and deliver an operator CA certificate. In both cases, requests and responses are protected by the shared key material that has been previously established between the user equipment and the authorisation server.

There will now be described a method in accordance with one embodiment of the invention to allow a subscriber using the user equipment UE to access a service provided by one of the service providers SP. The GBA client 4 communicates with the authentication server BSF to authenticate the subscriber based on his subscriber identity (e.g. username) and to agree on a shared key material $K_s$. The shared key material is derived from authentication information both in the authorising client 4 and the certification authority 10. The client 4 derives the shared key material Ks with the HTTP Digest AKA protocol requiring a secret key and cryptographic function to distil the shared key material Ks from the authentication challenge. The shared key material is held in the federation directory FD in association with the related subscriber identity for this authenticated session. The shared key material takes the form of an encrypting code.

The user equipment UE then generates a public key/private key pair and stores them with a service identifier $SI_i$ which identifies the service which the subscriber wishes to access. They can be stored in the memory 52 in the user equipment or in a smart card accessible by the user equipment.

The certification client 14 is invoked to request a certificate. A request includes the service identifier and the public key: the private key is kept secret. The request for the certificate is protected with the shared key material and is transmitted over the Ua interface to the certificate authority CA. The subscriber identity is also transmitted with the request.

At the certificate authority 10, the federation directory FD maps the service identifier $SI_i$ to the service specific identity $SSI_i$ for that service and that user name.

The certificate authority 10 fetches the shared key material $K_{si}$ based on the user name from BSF server 6 and verifies the authorisation header of the request. This is discussed in TS 33.221. Assuming that the request is valid, the certificate authority 10 issues a certificate which associates the public key with the service specific identity for the service identified by the service identifier in the request. The certificate is returned to the subscriber UE over the Ua interface, and the UE stores it in the memory 52 or smart card. In the case of multiple devices, the UE may forward the certificate to another device (laptop) possibly with the private key unless the other device generated the private key itself.

The certification client 14 advise the http client 20 over the HT3 interface that a valid certificate has been received and forwards the certificate for authentication to the SEC(TLS) gateway function 16 over the PK1 interface. The http client 20 then invokes the http server function 24 of the service provider for the service that it wishes to access, and includes the certificate. It also includes evidence by which the service provider can validate the certificate, including for example a digital signature comprising data encrypted with the private key.

The SEC(TLS) gateway 16 validates the certificate via the PK3 interface against a list of certificate authorities and, once the certificate has been authenticated, the service can be invoked for the subscriber. The SEC(TLS) gateway function 16 also challenges the client and verifies the response to authenticate the client (PK1), and causes the http server function 24 to provide the requested service to the authorised clients (HT4).

Authentication over the Ub interface takes place in accordance with the 3GGP standards TS 33.220, with authentication being done based on HTTP Digest AKA [RFC 3310], Authentication could also be carried out using 2G SIM.

Figure 4:
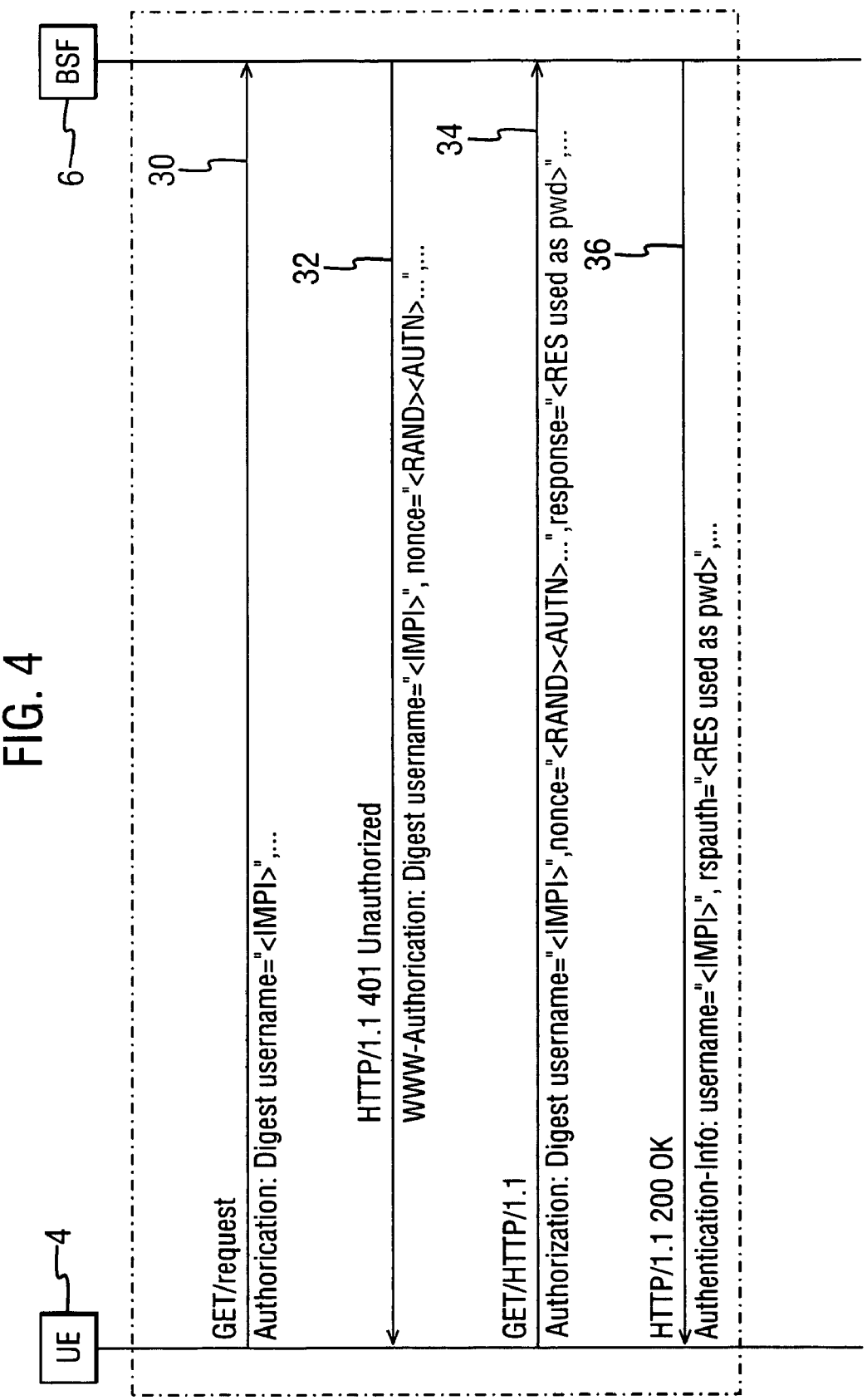
FIG. 4 illustrates the message flow between the subscriber and the authenticating server.

FIG. 4 shows part of the message flows between the user equipment UE implementing the authorisation client 4 (UE) and the authorisation server 6 (BSF) during the bootstrapping procedure. GBA client 4 initiates an authentication procedure by issuing an authentication request 30 GET request. The authentication request identifies the user using the subscriber identity; in this example it is the IMPI (IP Multimedia Private Identity). The other alternative could be IMSI, or the UE could generate a pseudo IMPI from the IMSI (as specified in TS 23.003). A HTTP response 32 is returned acknowledging the user identity IMPI and returning a nonce containing RAND and AUTN of AKA which uniquely identifies the request. The authentication client 4 at the user equipment returns a HTTP request 34 with a suitable password derived from AKA, and the authorisation server (BSF) 6 responds by returning authentication information which includes the bootstrapping transaction identifier (B-TID)(not shown in FIG. 4) which is used as the user name in Ua interface, and the shared key material is derived from the authentication information. It will be clear that the BSF has accessed the authentication information from the HSS, but this interaction is not shown in FIG. 2 because it is already known.

After the shared key material has been agreed by the message exchange of FIG. 4, then the certification client at the user equipment generates a certification request PKCS#10 which is transferred over the Ua interface to the CA. This is shown in FIG. 5. The certification request includes a number of fields in accordance with the established standard as follows:

---

POST /certificaterequest/ HTTP/1.1
Authorization: Digest
    username="adf . . . adf",
    realm="ca-naf@operator.com",
    qop="auth-int",
    algorithm="MD5",
    uri="/certificaterequest/",
    nonce="dffef12 . . . 2ff7",
    nc=00000001,
    cnonce="0a4fee . . . dd2f",
    response="6629 . . . af3e",
    opaque="e23f45 . . . dff2"
<base64 encoded PKCS#10 request>

---

The fields are known from RFC 2617. In this example, the HTTP message contains an Authorization HTTP header where the "username" could be B-TID, and the "opaque" field can include service identifiers.

The "Authorization" is the HTTP header associated with HTTP Digest authentication [RFC 2617]. The parameters in the Authorization header are used to authenticate and integrity protect the request. The PKCS#10 request contains the certification request itself including the public key of the user, and the service identifier.

In accordance with one embodiment of the invention, the certification request PKCS#10 also includes a service identifier field which identifies the service to be accessed by the user. The service can be identified in any one of a number of ways, for example by a transparent string, a realm address, a URI (universal resource identifier), a distinguished name etc. All that is needed is the unique identifier for the particular service to be accessed by the user. The service identifier is included in the PKCS#10 request, as one of the Extensions. As one example, there is an "extension Request" attribute in PKCS#9 that can be used with PKCS#10, with subjectAltName as the requested extension.

Alternatively, in CRMF (Certificate Request Message Format) [RFC 2511] it could be the subjectAltName extension in the certificate template (CertTemplate) field.

The CA(NAF) fetches the shared key material from the authorisation server BSF based on the username (B-TID) supplied in the certification request PKCS#10 and verifies the authorisation header using the shared key material. If it is successful, it processes the certification request and returns a certificate response labelled CERT in FIG. 5. The certificate response has the following format:

```
HTTP/1.1 200 OK
Content Type: application/x509-user-cert
Authentication-info:nextnonce="4ff232dd ... dd"
    qop=auth-int
    rspauth="4dd34 ... 55d2"
    cnonce="0a4fee ... dd2f"
    nc=00000001
<base 64 encoded subscriber x509 certificate>
```

The user equipment stores the certificate at the user equipment in the memory or smart card. The certificate activates the public key with the service identifier and can be authenticated using the asymmetric public key/private key pair.

By adding the service identifier to the certification request, this allows subscribers to have multiple certificates for multiple services. However, the user can retain a single identity towards each service because each subscriber certificate is associated with a particular service specific subscriber identity, rather than with a common ("global") identity whose activity could be tracked down, violating subscriber privacy. In other words we have replaced the subscriber and service specific Liberty Alliance assertions with subscriber and service specific public key certificates. In the above described embodiment, the CA identifies the service specific user identity based on the shared key material and the mapping which is held in the federation database.

In an alternative embodiment, the user equipment UE could send a certification request indicating its preferred identity, for example, in the case where a subscriber has several names for accessing a service provider.

At the CA (or federation directory therein), the (requester identifier, service identifier) pair is mapped to a service specific subscriber identity which is held in the federation database. The certification authority signs the public key certificate for the mapped identity and returns it to the user equipment.

This allows subscribers to have multiple identities in multiple certificates. The public keys in the certificates should differ to prevent linking the identities. Thus, the above described embodiment of the invention supports Liberty Alliance (LA) privacy standards by identity mapping with the public key certificate technology, but can reach a wider range of applications than the LA assertion mechanism.

In the above-described embodiment, the service identifier is included in an additional extension field in the PKCS#10 message. The service identifier is mapped to a service-specific identity at the federation database FD associated with the certification authority CA.

According to a first alternative embodiment, it is possible to send the service-specific identity in the request for certification. That is, the UE itself maps the subscriber identity to the desired service-specific identity for the certificate. In that case, the certificating authority must verify that the subscriber in question really owns the requested identity, and must keep an identity database for that verification. Therefore, the resulting architecture is more complex than the above-described embodiment, but the standard PKCS#10 protocol can be utilised without any additions between the user equipment and the network.

A further alternative allows some form of name string to be indicated in the subject field of the PKS#10 message. For example, in the case of user@realm name, the realm part can be the service identifier. In the case of a distinguished name the organisation part could be the service identifier. For example, distinguished name "CN=username, O=realm" could be used, as described in RFC 3280.

As mentioned above, the invention can be implemented in architectures other than the http server architecture discussed above. In particular, the functions of the SEC(TLS) gateway and http server and related interfaces (PK1, PK3, HT4, SP-AA) could be replaced with a single function that receives the subscriber certificate for authentication, optionally validates the certificate (PK3), challenges the client and verifies the response to authenticate the client (PK1), and provides the requested service to the authorised clients (HT4).

The invention claimed is:

1. A method, comprising:
    allocating to a user a plurality of service-specific identities to access respective services;
    issuing a request from a user equipment, the request identifying the service to be accessed and including a public key of the user; and
    at a certification authority, authenticating the request and issuing a public key certificate to bind a service-specific identity with the public key in the request, and returning the public key certificate to the user equipment.

2. The method according to claim 1, wherein the request comprises a service identifier identifying the service to be accessed and a requester identifier identifying the user, the method comprising:
    at the certification authority, mapping the service identifier and the requester identifier to the service-specific identity to be authenticated.

3. The method according to claim 1, wherein the request identifies the service-specific identity and wherein the method comprises:
    verifying by the certification authority that the user is authorized to use the service-specific identity.

4. The method according to claim 1, comprising implementing the allocating, issuing, authenticating and returning in a wireless communications network.

5. An apparatus, comprising:
    a processor configured to issue a request identifying a service to be accessed and including a public key;
    a receiver configured to receive a public key certificate issued by a certification authority which associates a service-specific identity for the service to be accessed with the public key; and
    a transmitter configured to forward the public key certificate to a service provider to authenticate the service-specific identity for the user which authorizes the access to the service.

6. The apparatus according to claim 5, further comprising:
    a controller configured to establish shared key material with the certification authority prior to issuing the request.

7. The apparatus according to claim 5, further comprising:
    a generator configured to generate an asymmetric key pair including the public key and a private key.

8. The apparatus according to claim 5, wherein said request is issued over a wireless interface.

9. An apparatus, comprising:
    a receiver configured to receive a request from a user equipment, the request identifying the service to be accessed and including a public key of a user; and
    an authenticator configured to authenticate the request and issue a public key certificate for a service-specific identity of the service to be accessed and to return the public key certificate to the user equipment.

10. The apparatus according to claim 9, wherein said receiver receives said request over a wireless interface.

11. A computer program embodied on a computer readable medium, said computer program configured to control a processor to perform:

issuing a request identifying a service to be accessed and including a public key;

receiving a public key certificate issued by a certification authority which associates a service-specific identity for the service to be accessed with the public key; and forwarding the public key certificate to a service provider to authenticate the service-specific identity for the user which authorizes the access to the service.

12. A method comprising:

issuing a request identifying a service to be accessed and including a public key;

receiving a public key certificate issued by a certification authority which associates a service-specific identity for the service to be accessed with the public key; and forwarding the public key certificate to a service provider to authenticate the service-specific identity for the user which authorizes the access to the service.

13. The method according to claim 12, wherein the issuing comprises issuing the request comprising a message including a plurality of fields, one of said fields holding a service identifier to identify the service to be accessed.

14. The method according to claim 13, wherein the field holding the service identifier is a subject field.

15. The method according to claim 13, wherein the issuing comprises issuing the request comprising a public key certificate #10 message.

16. The method according to claim 13, wherein the issuing comprises issuing the request comprising a certificate request message format message.

17. The method according to claim 13, wherein the issuing comprises issuing the request comprising a hypertext transfer protocol message.

18. A system comprising:

apparatus configured to issue a request, the request identifying the service to be accessed and including a public key of the user; and a certification authority configured to authenticate the request and issuing a public key certificate to bind a service-specific identity with the public key in the request, and returning the public key certificate to the user equipment.

19. The system according to claim 18, further comprising:

an authentication server configured to authenticate the identity of the user issuing the request.

20. The system according to claim 18, further comprising:

a federation database configured to map service and requester identifiers to service-specific identities to access respective services.

* * * * *